(12) United States Patent
Deshpande et al.

(10) Patent No.: US 10,979,279 B2
(45) Date of Patent: Apr. 13, 2021

(54) CLOCK SYNCHRONIZATION IN CLOUD COMPUTING

(71) Applicant: International Business Machines Corporation, Armonk, NY (US)

(72) Inventors: Chandrashekhar G. Deshpande, Navi Mumbai (IN); Shankar S. Kalyana, Austin, TX (US); Jigneshkumar K. Karia, Maharashtra (IN); Gandhi Sivakumar, Victoria (AU)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1625 days.

(21) Appl. No.: 14/323,607

(22) Filed: Jul. 3, 2014

(65) Prior Publication Data
US 2016/0006804 A1    Jan. 7, 2016

(51) Int. Cl.
*H04L 29/08* (2006.01)
*H04L 12/24* (2006.01)
(Continued)

(52) U.S. Cl.
CPC ........ *H04L 41/0213* (2013.01); *H04J 3/0641* (2013.01); *H04J 3/0658* (2013.01); *H04L 67/10* (2013.01)

(58) Field of Classification Search
CPC ..... G06F 1/12; G06F 1/10; G06F 1/06; G06F 1/04; G06F 1/08; G06F 1/14; G06F 1/105;
(Continued)

(56) References Cited

U.S. PATENT DOCUMENTS 5,809,543 A * 9/1998 Byers ................. G06F 11/1666
                                                          711/120
7,574,496 B2   8/2009 McCrory et al.
(Continued)

FOREIGN PATENT DOCUMENTS

EP    1142176 A2   10/2001
EP    1153524 A1   11/2001
(Continued)

OTHER PUBLICATIONS

Matson, Josh; Choosing the correct Time Synchronization Protocol and incorporating the 1756-TIME module into your Application; May 2013; Rockwell Automation, Inc.; pp. 1-8.*
(Continued)

*Primary Examiner* — Muhammad Raza
(74) *Attorney, Agent, or Firm* — Law Offices of Ira D. Blecker, P.C.

(57) ABSTRACT

Method of clock synchronization in cloud computing. A plurality of physical computer assets are provided. The plurality of physical computer assets are linked together to form a virtualized computing cloud, the virtualized computing cloud having a centralized clock for coordinating the operation of the virtualized computing cloud; the virtualized computing cloud is logically partitioned into a plurality of virtualized logical server clouds, each of the virtualized logical server clouds having a local clock synchronized to the same centralized clock; a clock type from a clock palette is selected for at least one of the virtualized logical server clouds; the clock type is implemented in the at least one of the virtualized logical server clouds such that the clock type is synchronized to the at least one of the virtualized logical server clouds; and the centralized clock is disabled. The method may be performed on one or more computing devices.

15 Claims, 3 Drawing Sheets

(51) Int. Cl.
G06F 1/14 (2006.01)
G06F 1/12 (2006.01)
H04J 3/06 (2006.01)

(58) Field of Classification Search
CPC ...... H04J 3/0667; H04J 3/0658; H04J 3/0641; H04L 67/1095; H04L 41/0213; H04L 67/10; H04L 67/02; H04L 67/42; H04L 7/0012; H04L 69/28; H04W 56/0015; H04W 92/10; G04G 5/00
See application file for complete search history.

(56) References Cited

U.S. PATENT DOCUMENTS

| | | |
|---|---|---|
| 8,150,800 B2 | 4/2012 | Webman et al. |
| 8,259,758 B2 | 9/2012 | Chen et al. |
| 8,300,615 B2 | 10/2012 | Copeland et al. |
| 2002/0152271 A1* | 10/2002 | Chafle ............... G09B 5/06 709/203 |
| 2005/0160303 A1* | 7/2005 | Fricano ............ G06F 12/0808 713/600 |
| 2006/0109376 A1* | 5/2006 | Chaffee ............ G05B 19/0423 348/423.1 |
| 2008/0049743 A1* | 2/2008 | Zampetti ............... G04G 5/00 370/389 |
| 2011/0164625 A1 | 7/2011 | Fourcand |
| 2012/0042047 A1* | 2/2012 | Chen .................. G06F 1/12 709/219 |
| 2012/0092184 A1* | 4/2012 | Carr ................ H04W 56/0015 340/870.14 |
| 2012/0213508 A1 | 8/2012 | Moynihan |
| 2012/0233251 A1 | 9/2012 | Holt |
| 2012/0233490 A1 | 9/2012 | Barton et al. |
| 2012/0250704 A1 | 10/2012 | Yamada et al. |
| 2012/0301147 A1 | 11/2012 | Zhao et al. |
| 2013/0034086 A1 | 2/2013 | Martin et al. |
| 2013/0061078 A1* | 3/2013 | Cullimore ............ G06F 9/5066 713/323 |
| 2013/0212420 A1* | 8/2013 | Lawson ............ G05B 19/4185 713/400 |
| 2013/0246832 A1* | 9/2013 | Funaki .................. G06F 1/12 713/400 |
| 2014/0013008 A1* | 1/2014 | Lazarus ............ H04L 29/06993 709/248 |
| 2014/0122915 A1* | 5/2014 | Frels .................. G06F 1/12 713/400 |
| 2014/0165060 A1* | 6/2014 | Muller ................ G06F 9/5022 718/1 |
| 2014/0281037 A1* | 9/2014 | Spada ................ H04L 69/28 709/248 |
| 2015/0058486 A1* | 2/2015 | Huang ................ H04L 47/70 709/226 |
| 2015/0245306 A1* | 8/2015 | Boehlke ............ H04J 3/0664 370/350 |
| 2015/0312021 A1* | 10/2015 | Liu .................... G04R 20/28 370/350 |
| 2015/0350101 A1* | 12/2015 | Sinha ................ G06F 9/00 709/226 |

FOREIGN PATENT DOCUMENTS

| | | |
|---|---|---|
| EP | 1208412 A2 | 5/2002 |
| EP | 1240769 A2 | 9/2002 |
| EP | 1350355 B1 | 3/2007 |
| EP | 2418585 A1 | 2/2012 |
| EP | 2534775 A1 | 12/2012 |

OTHER PUBLICATIONS

Jagmohan Chauhan et al., Is doing Clock synchronization in a VM a Good Idea?, Proc. of IPCCC, 2011 (the month is before Applicants' earliest conceptiom date), all pages.

"The Berkeley Algorithm". [online],[retrieved on Jan. 7, 2014]. Retrieved from the Internet <URL: http://www2.cs.man.ac.uk/~raym8/comp28112/man/node108.html>, all pages.

"Chapter 5 Synchronization", [online], [retrieved on Feb. 4, 2014]. Retrieved from the Internet <URL: http://www.slideshare.net/usks_87/chap-5-presentation>, all pages.

"Describe the Ciock Synchronization Algorithms and Distributed Algortihms in the Context of Synchronization?", [retrieved on Feb. 4, 2014]. Retrieved from the Internet <URL: https://sites.google.com/site/assignmentssolved/mca/semester5/mc0085/6>, all pages.

"Introduction to Distributed Clock Synchronization and the EEEE 1588 Precision Time Protocol", Retrieved from the Internet <URL: http://www.ni.com/white-paper/2822/en>, Oct. 29, 2013.

* cited by examiner

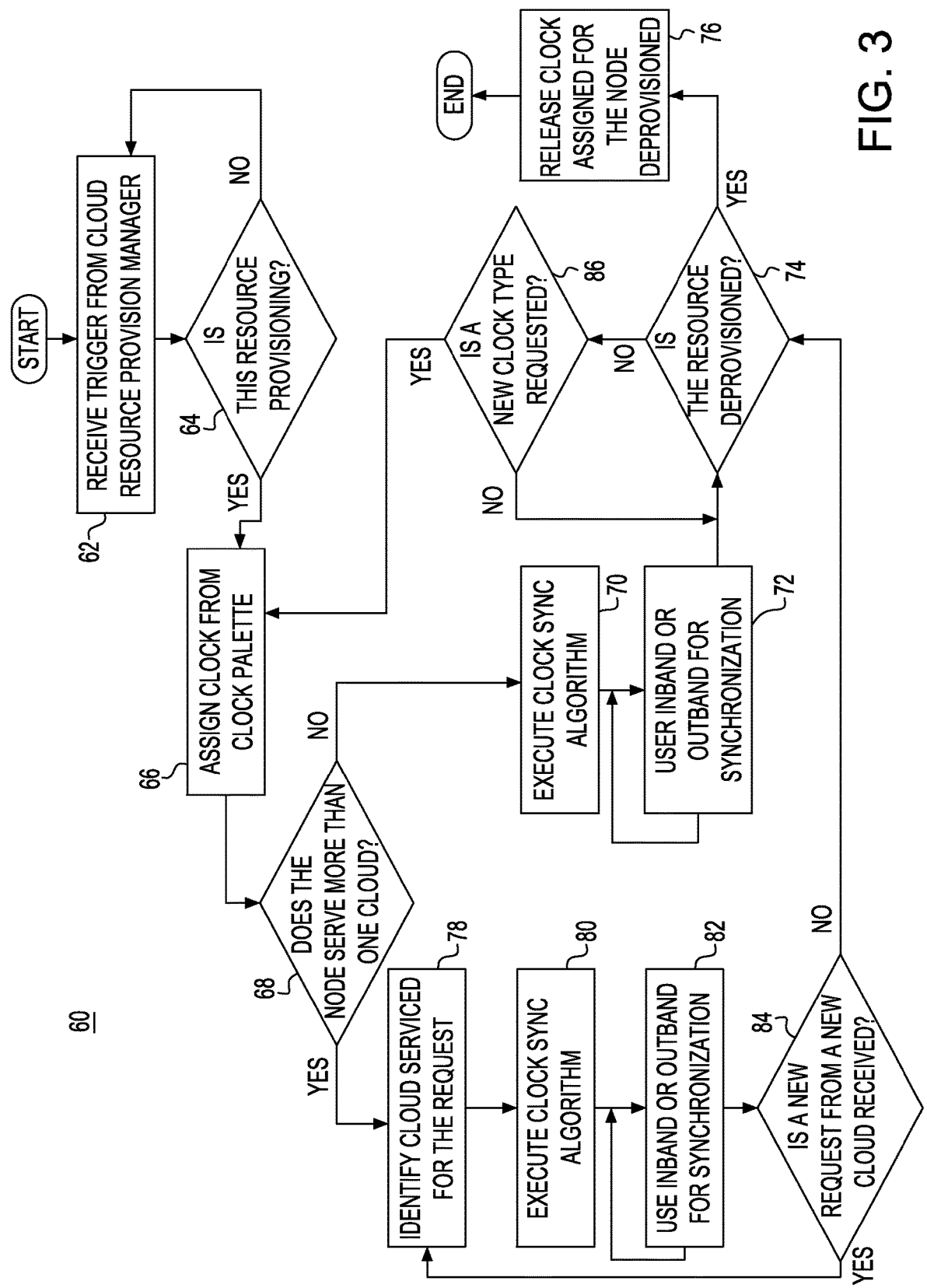

CLOCK SYNCHRONIZATION IN CLOUD COMPUTING

BACKGROUND

The present exemplary embodiments relate to clock synchronization in cloud computing and, more particularly, relate to clock synchronization wherein each logically partitioned resource in the cloud has its own clock that is not tied to the central clock of the computing cloud.

There are many situations in which it is desired to lease one or more server computer systems on a short or long-term basis. Examples include educational or classroom services, demonstration of software to potential users or buyers, website server applications, etc. The servers may be preconfigured with selected operating systems and application software as desired. Although physical servers may be leased and physically delivered for onsite use, servers may also be leased from a central or remote location and accessed via an intermediate network system, such as the Internet. The primary considerations for remote access include the capabilities of the remote access software and the network connection or interface.

Cloud computing in general can be portrayed as a synonym for distributed computing or grid computing over a network, with the ability to run a program or application on many connected computers at the same time. It specifically refers to a computing hardware machine or group of computing hardware machines commonly referred to as a server connected through a communication network such as the Internet, an intranet, a local area network (LAN) or wide area network (WAN). Individual users or a user who have permission to access the server can use the server's processing power for their individual computing needs such as to run an application, store data or any other computing need. Therefore, instead of using a personal computer every-time to run the application, the individual can now run the application from anywhere in the world, as the server provides the processing power to the application and the server is also connected to a network via internet or other connection platforms to be accessed from anywhere.

Virtualization technology has enabled multiple logical servers to operate on a single physical computer. Previously, logical servers were tied directly to physical servers because they relied on the physical server's attributes and resources for their identity. Virtualization technology weakened this restriction by allowing multiple logical servers to override a physical server's attributes and share its resources. Each logical server is operated substantially independent of other logical servers and provides virtual isolation among users effectively partitioning a physical server into multiple logical servers.

The cloud is essentially a collection of virtualized logical devices through which a user may access the processing power of the cloud. The essential element of a cloud is that all virtualized logical devices in the cloud may be accessed without any knowledge of the underlying physical devices within the cloud. The boundary of the cloud may be defined by the physical resources controlled by a cloud manager. Based upon demand, the cloud boundary may increase or decrease through dynamic resource management algorithms.

Each of the physical devices that make up the cloud has a clock for synchronization and these clocks are synchronized to form a centralized clock for the cloud. Moreover, each of the virtualized logical devices in the cloud is synchronized according to the centralized clock.

BRIEF SUMMARY

The various advantages and purposes of the exemplary embodiments as described above and hereafter are achieved by providing, according to a first aspect of the exemplary embodiments, a method of clock synchronization in cloud computing comprising: providing a plurality of physical computer assets including at least one physical server having a central processing unit; linking the plurality of physical computer assets together to form a virtualized computing cloud, the virtualized computing cloud having a centralized clock for coordinating the operation of the virtualized computing cloud; logically partitioning the virtualized computing cloud into a plurality of virtualized logical server clouds, each of the virtualized logical server clouds having a local clock synchronized to the centralized clock of the virtualized computing cloud; selecting a clock type from a clock palette associated with the virtualized computing cloud for at least one of the virtualized logical server clouds; implementing the clock type in the at least one of the virtualized logical server clouds such that the clock type is synchronized to the at least one of the virtualized logical server clouds; and disabling the centralized clock in the at least one of the virtualized logical server clouds. The method may be performed on one or more computing devices.

According to a second aspect of the exemplary embodiments, there is provided a computer program product for clock synchronization in cloud computing having a plurality of physical computer assets including at least one physical server having a central processing unit. The computer program product comprising a computer readable storage medium having computer readable program code embodied therewith. The computer readable program code comprising: computer readable program code configured to link the plurality of physical computer assets together to form a virtualized computing cloud, the virtualized computing cloud having a centralized clock for coordinating the operation of the virtualized computing cloud; computer readable program code configured to logically partition the virtualized computing cloud into a plurality of virtualized logical server clouds, each of the virtualized logical server clouds having a local clock synchronized to the centralized clock of the virtualized computing cloud; computer readable program code configured to select a clock type from a clock palette associated with the virtualized computing cloud for at least one of the virtualized logical server clouds; computer readable program code configured to implement the clock type in the at least one of the virtualized logical server clouds such that the clock type is synchronized to the at least one of the virtualized logical server clouds; and computer readable program code configured to disable the centralized clock in the at least one of the virtualized logical server clouds.

According to a third aspect of the exemplary embodiments, there is provided a system for clock synchronization in cloud computing comprising: a plurality of physical computer assets including at least one physical server having a central processing unit; and a computer readable storage medium having computer readable program code embodied therewith. The computer readable program code comprising: computer readable program code configured to link the plurality of physical computer assets together to form a virtualized computing cloud, the virtualized computing cloud having a centralized clock for coordinating the operation of the virtualized computing cloud; computer readable program code configured to logically partition the virtualized computing cloud into a plurality of virtualized logical server clouds, each of the virtualized logical server clouds having a local clock synchronized to the centralized clock of the virtualized computing cloud; computer readable program code configured to select a clock type from a clock palette associated with the virtualized computing cloud for at least one of the virtualized logical server clouds; computer readable program code configured to implement the clock type in the at least one of the virtualized logical server clouds such that the clock type is synchronized to the at least one of the virtualized logical server clouds; and computer readable program code configured to disable the centralized clock in the at least one of the virtualized logical server clouds.

BRIEF DESCRIPTION OF SEVERAL VIEWS OF THE DRAWINGS

The features of the exemplary embodiments believed to be novel and the elements characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

FIG. 3 is a flow chart illustrating a process of the exemplary embodiments.

DETAILED DESCRIPTION

There is a problem when each of the virtualized logical devices in the cloud is synchronized according to the centralized clock since each virtualized logical device may require a different clock. For example, one virtualized logical device may require Network Time Protocol while another virtualized logical device may require Precision Time Protocol. The separate needs of these two virtualized logical devices is not possible to satisfy with the current cloud computing environment since the virtualized logical devices in a cloud are all synchronized only to the centralized clock of the cloud.

Figure 1:
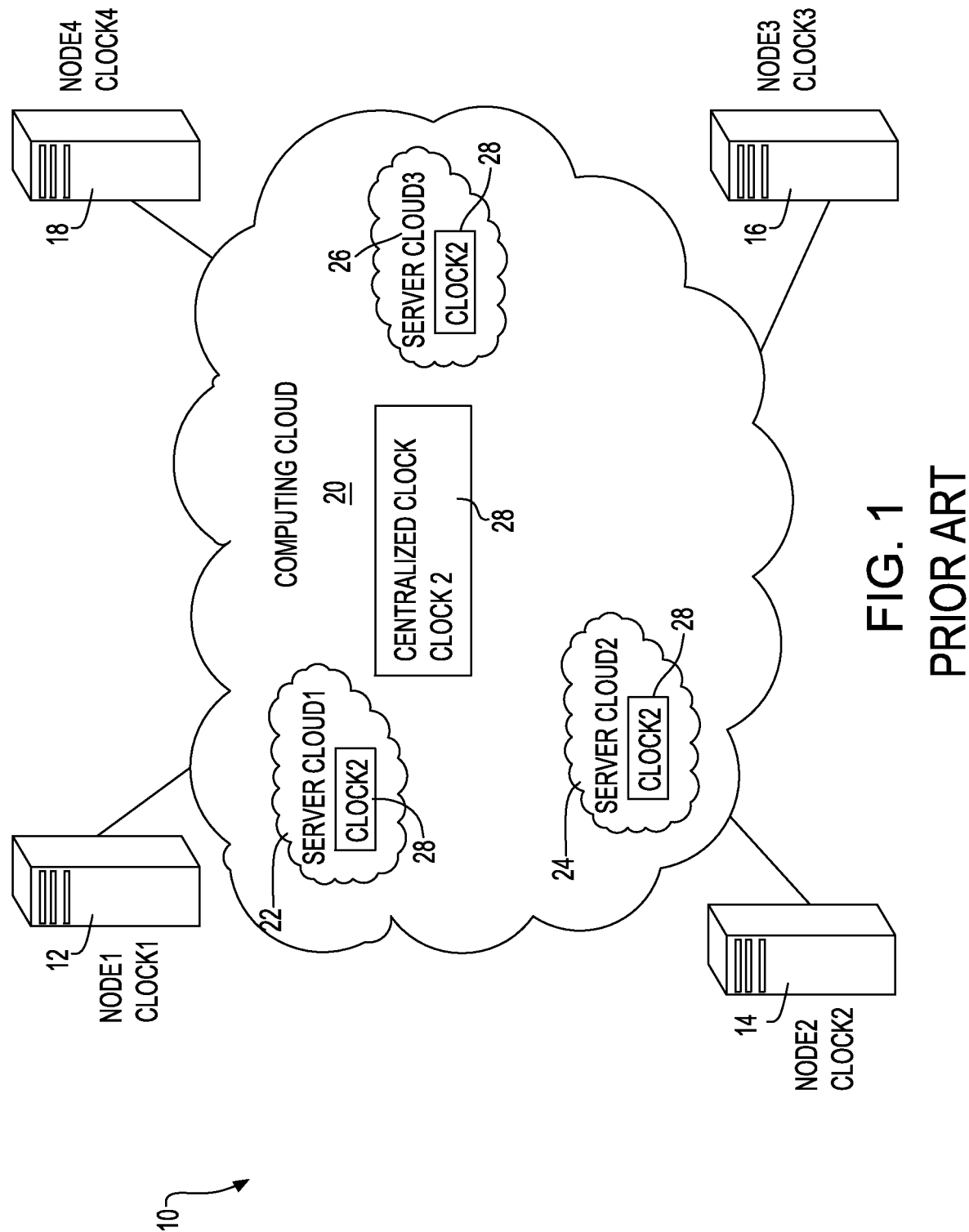
FIG. 1 illustrates a conventional computing cloud environment with a centralized clock.

The problem is further illustrated in FIG. 1 which shows a conventional computing cloud environment 10. As shown in FIG. 1, there are four physical resources, hereafter nodes, namely, node1 12, node2 14, node3 16 and node4 18. The nodes 12, 14, 16, 18 may be nearby or may be geographically separated. In addition, each of the nodes 12, 14, 16, 18 may be the same or different physical resource and may include but not be limited to mainframes, servers, laptops, tablets and mobile devices. Each of the nodes 12, 14, 16, 18 may have a clock for synchronization, hereafter clock1 for node1 12, clock 2 for node2 14, clock3 for node3 16 and clock4 for node4 18.

All or part of the nodes 12, 14, 16, 18 may constitute the physical devices which form the boundary of the virtualized computing cloud 20 (hereafter just "computing cloud"). As described previously, the computing cloud 20 does not typically contain any physical devices but rather is a virtualized environment. The computing cloud 20 may have a centralized clock 28 (in this case using clock2 from node2 14) which is synchronized to the nodes 12, 14, 16, 18 using a suitable clock algorithm.

The computing cloud 20 may be logically partitioned into a plurality of virtualized logical server clouds (hereafter "server clouds") such as server cloud1 22, server cloud2 24 and server cloud3 26. Each of the server clouds 22, 24, 26 is synchronized with the centralized clock 28 as illustrated by including the centralized clock 28 in each of the server clouds 22, 24, 26. Such a "one clock type fits all" presents a problem when the centralized clock 28 is not the best clock for synchronization for the particular server cloud.

Figure 2:
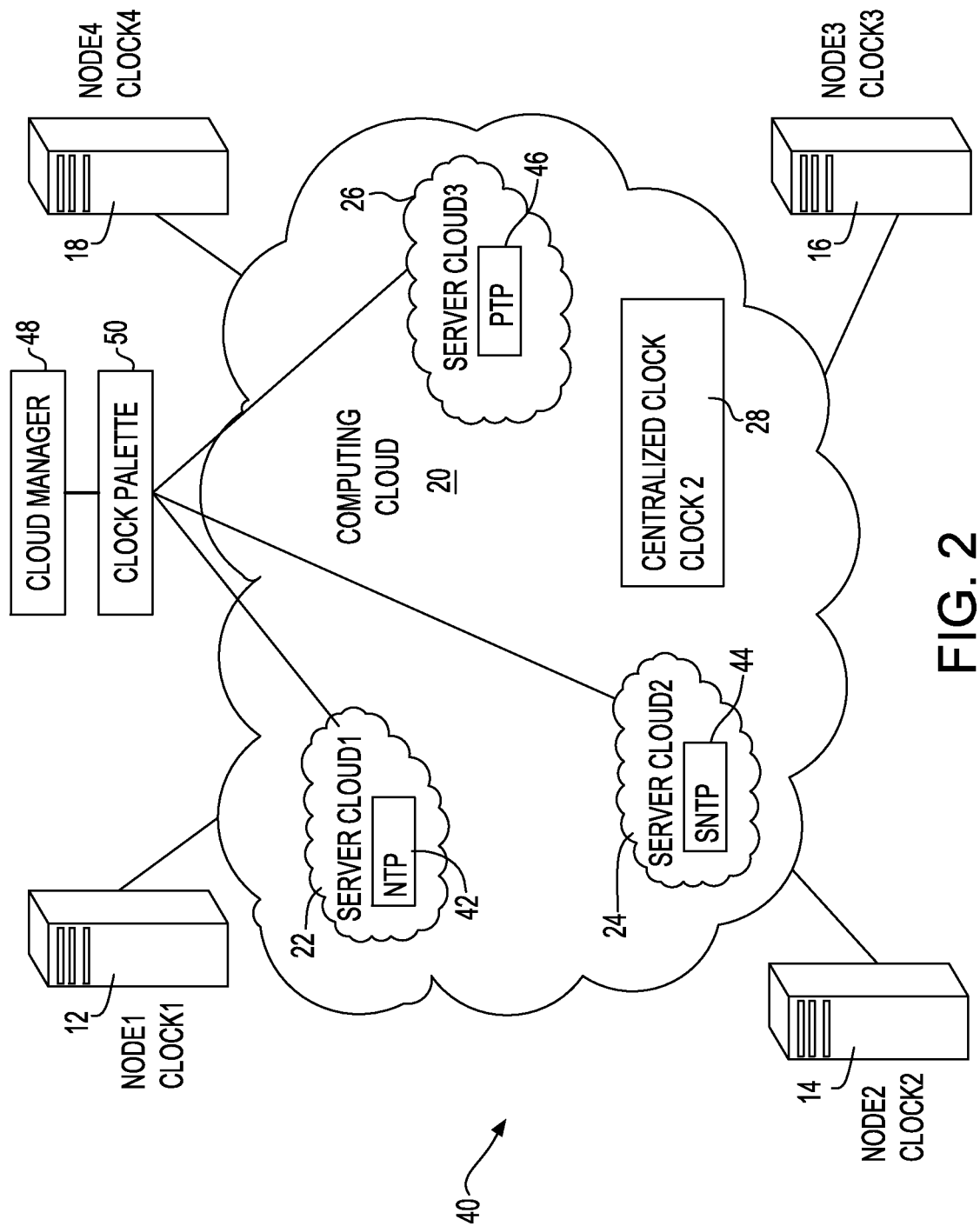
FIG. 2 illustrates a computing cloud environment according to the exemplary embodiments in which each of the virtualized logical server clouds has its own clock synchronized to the individual virtualized logical server cloud.

Referring now to FIG. 2, there is illustrated a computing cloud environment 40 according to the exemplary embodiments.

Computing cloud environment 40 may include the same physical resources as in computing cloud environment 10 in FIG. 1 such as node1 12, node2 14, node3 16 and node4 18. Computing cloud environment 40 may additionally include virtualized computer cloud 20 as well as server cloud1 22, server cloud2 24 and server cloud3 26. Computing cloud environment 40 may in addition include the centralized clock 28, again using clock2 from node2 14 as the centralized clock 28.

The present inventors enable each of the server clouds 22, 24, 26 to have a clock different than centralized clock 28 if the users of the server clouds 22, 24, 26 find it advantageous to do. In this regard, the computing cloud 20 may include a clock palette 50 which through a graphical user interface, for example, may offer a variety of clocks from which the user may choose. The variety of clocks may include, for purposes of illustration and not limitation, Network Time Protocol (NTP), Simple Network Time Protocol (SNTP), Precision Time Protocol (PTP), IRIG B-122 and Time Triggered Protocol (TTP). The clock palette 50 may be contained within or in addition to a cloud manager 48. The cloud manager 48 and/or the clock palette 50 may reside in the computing cloud 20, in one of the nodes 12, 14, 16, 18 or even in a separate physical or logical resource.

The server clouds 22, 24, 26 may select a suitable clock from the clock palette 50. For example, for purposes of illustration and not limitation, server cloud1 22 may select an NTP clock 42, server cloud2 24 may select an SNTP clock 44 and server cloud3 26 may select a PTP clock 46. In this way, each of the server clouds 22, 24, 26 may be individually synchronized to their own logical partition and not to the centralized clock 28. The centralized clock 28 that would normally be present in each of the server clouds 22, 24, 26 would then be disabled.

When any of the server clouds 22, 24, 26 is no longer needed and is deprovisioned, the clock selected from the clock palette 50 is released back to the clock palette 50. "Deprovisioned" means that the partition gets released to the resource pool and the clock selected from the clock palette 50 is disabled.

The present exemplary embodiments become even more important when the server clouds cater to more than one virtualized computer cloud. A partitioned resource may have more than one partition. For example, partition 1 of the partitioned resource may be included to be a part of cloud 1 and partition 2 of the partitioned resource may be provisioned to be a part of cloud 2. In other words, a physical server may now have 2 partitions but each may belong to a different cloud.

Referring now to FIG. 3, there is illustrated a flow chart for the exemplary embodiments. The process starts by receiving a trigger from the cloud resource provision manager (or similar instrumentality), box 62, to provide a set of logical resources in the computing cloud.

Proceeding to decision block 64, if the resource(s) is provisioning (i.e., actually partitioning to form a server cloud), a clock is assigned to the server cloud from the clock palette, box 66. If the resource is not actually provisioning, the process returns to box 62 to wait for another instruction from the cloud resource provision manager.

After the clock is assigned to the server cloud, box 66, the process decides if the server cloud serves more than one computing cloud, box 68. If there is only one computing cloud, the simplest case, the process takes the "NO" route so then a clock synchronization algorithm is executed to sync the clock assigned from the palette to the server cloud, box 70.

Inband or outband may be used for synchronization of the clock. When the apparatus for clock synchronization resides within the physical devices of the computing cloud 20 it is called "inband" and if the apparatus for clock synchronization exists externally of the physical devices of the computing cloud 20 it is called out of band. This inband/outband dichotomy is to give flexibility to use the hardware which may not have inbuilt functionality for clock synchronization.

The process then determines if the server cloud is no longer needed, box 74. If the server cloud is no longer needed, the server cloud is deprovisioned and the palette clock is released back to the palette, box 76. If the server cloud is not deprovisioned, the process proceeds to determining if a new clock type is requested, box 86. If a new clock is requested, the process returns back to assign a clock from the clock palette, box 66. If a new clock is not requested, then the process returns back to box 74 to see if the resource is deprovisioned.

Returning back to decision block 68, if there is more than one computing cloud, then the process takes the "YES" route and proceeds to identify the computing cloud that the server cloud serves, box 78, followed by executing the clock synchronization algorithm applicable to the server cloud and identified computing cloud, box 80.

The process then may use inband or outband synchronization as discussed previously, box 82.

The process then determines if there is a request for another cloud, box 84. If so, the process takes the "YES" route and returns to identify the cloud, box 78. If not, the process takes the "NO" route and proceeds to determine if the server cloud is no longer needed, box 74. If the server cloud is deprovisioned, the palette clock is released back to the palette, box 76. If the server cloud is not deprovisioned, the process proceeds to determine if a new clock type is requested, and if so, the process returns to assign a clock from the clock palette, box 66. If a new clock is not requested, then the process returns to determine if the process is deprovisioned, box 74. Eventually, the resource is deprovisioned and the clock is released back to the clock palette, box 76.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent to those skilled in the art having regard to this disclosure that other modifications of the exemplary embodiments beyond those embodiments specifically described here may be made without departing from the spirit of the invention. Accordingly, such modifications are considered within the scope of the invention as limited solely by the appended claims.

What is claimed is:

1. A method of clock synchronization in cloud computing comprising:
    providing a plurality of physical computer assets including at least one physical server having a central processing unit;
    linking the plurality of physical computer assets together to form a virtualized computing cloud, the virtualized computing cloud having a centralized clock for coordinating the operation of the virtualized computing cloud;
    logically partitioning the virtualized computing cloud into a plurality of virtualized logical server clouds, each of the virtualized logical server clouds having a local clock synchronized to the centralized clock of the virtualized computing cloud;
    selecting a first clock type from a clock protocol palette associated with the virtualized computing cloud for a first virtualized logical server cloud, the clock protocol palette having a plurality of different clock protocol types, wherein the first clock type selected is a suitable clock for synchronization of the first virtualized logical server cloud;
    selecting a second clock type from the clock protocol palette associated with the virtualized computing cloud for a second virtualized logical server cloud such that the first clock type and the second clock type are different clock types, wherein the second clock type selected is a suitable clock for synchronization of the second virtualized logical server cloud;
    implementing the first clock type in the first virtualized logical server cloud such that the first clock type is synchronized to the first virtualized logical server cloud;
    implementing the second clock type in the second virtualized logical server cloud such that the second clock type is synchronized to the second virtualized logical server cloud, the second clock type being implemented in the second virtualized logical server cloud at the same time as the first clock type being implemented in the first virtualized logical server cloud; and
    disabling the centralized clock in the first and second virtualized logical server clouds so that the first virtualized logical server cloud is synchronized only to the first clock type and the second virtualized logical server cloud is synchronized only to the second clock type;
    wherein the method is performed on one or more computing devices.

2. The method of claim 1 wherein at least one of the virtualized logical server clouds serves more than one virtualized computing cloud and before the steps of selecting a first clock type and a second clock type, further comprising selecting the virtualized computing cloud served by the at least one of the virtualized logical server clouds.

3. The method of claim 1 further comprising deprovisioning at least one of the first virtualized logical server cloud and the second virtualized logical server cloud and releasing at least one of the corresponding first clock type and second clock type back to the clock palette.

4. The method of claim 1 wherein the first clock type and second clock type are selected from the group consisting of Network Time Protocol (NTP), Simple Network Time Protocol (SNTP), Precision Time Protocol (PTP), RIG B-122 Protocol and Time Triggered Protocol (TTP).

5. The method of claim 1 wherein the plurality of virtualized logical server clouds other than the first and second virtualized logical server clouds are synchronized to the centralized clock.

6. A computer program product for clock synchronization in cloud computing having a plurality of physical computer assets including at least one physical server having a central processing unit, the computer program product comprising:
    a non-transitory computer readable storage medium having computer readable program code embodied therewith, the computer readable program code comprising:
    computer readable program code configured to link the plurality of physical computer assets together to form a virtualized computing cloud, the virtualized computing cloud having a centralized clock for coordinating the operation of the virtualized computing cloud;

computer readable program code configured to logically partition the virtualized computing cloud into a plurality of virtualized logical server clouds, each of the virtualized logical server clouds having a local clock synchronized to the centralized clock of the virtualized computing cloud;

computer readable program code configured to select a first clock type from a clock protocol palette associated with the virtualized computing cloud for a first virtualized logical server cloud, the clock protocol palette having a plurality of different clock protocol types, wherein the first clock type selected is a suitable clock for synchronization of the first virtualized logical server cloud;

computer readable program code configured to select a second clock type from the clock protocol palette associated with the virtualized computing cloud for a second virtualized logical server cloud such that the first clock type and the second clock type are different clock types, wherein the second clock type selected is a suitable clock for synchronization of the second virtualized logical server cloud;

computer readable program code configured to implement the first clock type in the first virtualized logical server cloud such that the first clock type is synchronized to the first virtualized logical server cloud;

computer readable program code configured to implement the second clock type in the second virtualized logical server cloud such that the second clock type is synchronized to the second virtualized logical server cloud the second clock type being implemented in the second virtualized logical server cloud at the same time as the first clock type being implemented in the first virtualized logical server cloud; and computer readable program code configured to disable the centralized clock in the first and second virtualized logical server clouds so that the first virtualized logical server cloud is synchronized only to the first clock type and the second virtualized logical server cloud is synchronized only to the second clock type.

7. The computer program product of claim 6 wherein at least one of the virtualized logical server clouds serves more than one virtualized computing cloud and before the computer readable program code configured to select the first clock type and the second clock type, further comprising computer readable program code configured to select the virtualized computing cloud served by the at least one of the virtualized logical server clouds.

8. The computer program product of claim 6 further comprising computer readable program code configured to deprovision at least one of the first virtualized logical server cloud and the second virtualized logical server cloud and release at least one of the corresponding first clock type and second clock type back to the clock palette.

9. The computer program product of claim 6 wherein the first clock type and second clock type are selected from the group consisting of Network Time Protocol (NTP), Simple Network Time Protocol (SNTP), Precision Time Protocol (PTP), RIG B-122 Protocol and Time Triggered Protocol (TTP).

10. The computer program product of claim 6 wherein the plurality of virtualized logical server clouds other than the first and second virtualized logical server clouds are synchronized to the centralized clock.

11. A system for clock synchronization in cloud computing comprising:

a plurality of physical computer assets including at least one physical server having a central processing unit; and a non-transitory computer readable storage medium having computer readable program code embodied therewith, the computer readable program code comprising:

computer readable program code configured to link the plurality of physical computer assets together to form a virtualized computing cloud, the virtualized computing cloud having a centralized clock for coordinating the operation of the virtualized computing cloud;

computer readable program code configured to logically partition the virtualized computing cloud into a plurality of virtualized logical server clouds, each of the virtualized logical server clouds having a local clock synchronized to the centralized clock of the virtualized computing cloud;

computer readable program code configured to select a first clock type from a clock protocol palette associated with the virtualized computing cloud for a first virtualized logical server cloud, the clock protocol palette having a plurality of different clock protocol types, wherein the first clock type selected is a suitable clock for synchronization of the first virtualized logical server cloud;

computer readable program code configured to select a second clock type from the clock protocol palette associated with the virtualized computing cloud for a second virtualized logical server cloud such that the first clock type and the second clock type are different clock types, wherein the second clock type selected is a suitable clock for synchronization of the second virtualized logical server cloud;

computer readable program code configured to implement the first clock type in the first virtualized logical server cloud such that the first clock type is synchronized to the first virtualized logical server cloud;

computer readable program code configured to implement the second clock type in the second virtualized logical server cloud such that the second clock type is synchronized to the second virtualized logical server cloud, the second clock type being implemented in the second virtualized logical server cloud at the same time as the first clock type being implemented in the first virtualized logical server cloud; and computer readable program code configured to disable the centralized clock in the first and second virtualized logical server clouds so that the first virtualized logical server cloud is synchronized only to the first clock type and the second virtualized logical server cloud is synchronized only to the second clock type.

12. The system of claim 11 wherein at least one of the virtualized logical server clouds serves more than one virtualized computing cloud and before the computer readable program code configured to select a first clock type and a second clock type, further comprising computer readable program code configured to select the virtualized computing cloud served by the at least one of the virtualized logical server clouds.

13. The system of claim 11 further comprising computer readable program code configured to deprovision at least one of the first virtualized logical server cloud and the second virtualized logical server cloud and release at least one of the corresponding first clock type and second clock type back to the clock palette.

14. The system of claim 11 wherein the first clock type and second clock type are selected from the group consisting of Network Time Protocol (NTP), Simple Network Time Protocol (SNTP), Precision Time Protocol (PTP), RIG B-122 Protocol and Time Triggered Protocol (TTP).

15. The system of claim 11 wherein the plurality of virtualized logical server clouds other than the first and second virtualized logical server clouds are synchronized to the centralized clock.

\* \* \* \* \*